July 14, 1942.   G. RALSTON   2,289,855
MACHINE FOR DRILLING OR BORING HOLES
Filed Nov. 29, 1939   4 Sheets-Sheet 1

INVENTOR:
GAVIN RALSTON
BY: Haseltine, Lake & Co
ATTORNEYS

July 14, 1942.　　　　G. RALSTON　　　　2,289,855
MACHINE FOR DRILLING OR BORING HOLES
Filed Nov. 29, 1939　　　4 Sheets-Sheet 2

INVENTOR:
GAVIN RALSTON
BY: Haseltine, Lake & Co.
ATTORNEYS

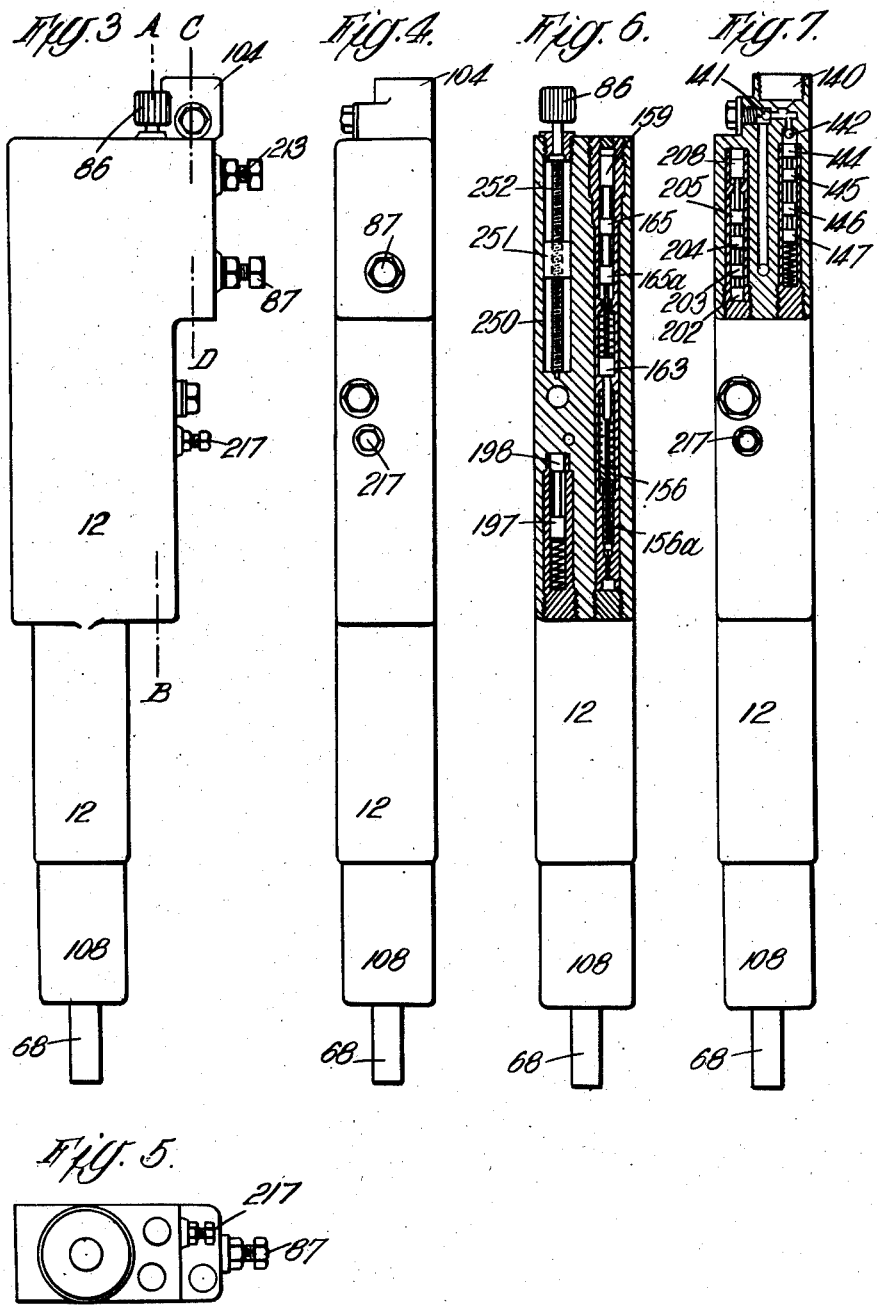

July 14, 1942.  G. RALSTON  2,289,855
MACHINE FOR DRILLING OR BORING HOLES.
Filed Nov. 29, 1939   4 Sheets-Sheet 4

INVENTOR:
GAVIN RALSTON
BY: Haseltine, Lake & Co.
ATTORNEYS

Patented July 14, 1942

2,289,855

UNITED STATES PATENT OFFICE 2,289,855

MACHINE FOR DRILLING OR BORING HOLES

Gavin Ralston, Weybridge, England

Application November 29, 1939, Serial No. 306,615
In Great Britain December 23, 1938

29 Claims. (Cl. 77—21)

The invention relates to a machine for drilling or boring holes in various substances and the object is to provide a machine capable of drilling or boring at one and the same time, to a set plan of spacings and angles, a multiplicity of holes of the same or differing size and length, in a workpiece, each time the machine is put into operation by a single operator, and which is adaptable by the rearrangement of its constituent parts from time to time, to produce different plans of drilling or boring upon a workpiece.

The improved machine according to the present invention comprises a bedplate having a number of suitably arranged T slots, a plurality of hydraulic operated drilling or boring heads, compactly constructed as adjustable and detachable units, a series of frames, brackets, bolsters, angle plates, and spacing blocks constructed as detachable elements adjustably secured upon the said bedplate and supporting the detachable drilling or boring heads upon the bedplate, an electric motor, an hydraulic pump, a variable speed gear box connecting the hydraulic pump with the said electric motor, pipes connecting between the hydraulic pump and the hydraulically operated drilling or boring heads, means for rotating, advancing, retracting, and regulating the length of travel and the rate of advance of a drill or boring tool operating spindle housed within each of the drilling or boring heads, means for starting from one localized point the operation of all the drill or boring tool operating spindles at the same instant of time, and stopping and retracting each drill or boring tool operating spindle automatically and independently as its drilling or boring operation is completed, and means for automatically stopping the whole machine immediately after the drill or boring tool operating spindle which last completes its drilling or boring operation has ceased to revolve and has been retracted from the workpiece.

The invention is illustrated in its preferred embodiment in the accompanying drawings in which—

Figure 3 is a side elevation of one of the drilling or boring heads.

Figure 4 is a front elevation of a drilling or bring head.

Figure 5 is an underside plan of a drilling or boring head.

Figure 6 is a section on line A, B Figure 3 of a drilling or boring head.

Figure 7 is a section on line C, D Figure 3 of a drilling or boring head.

Figure 1:
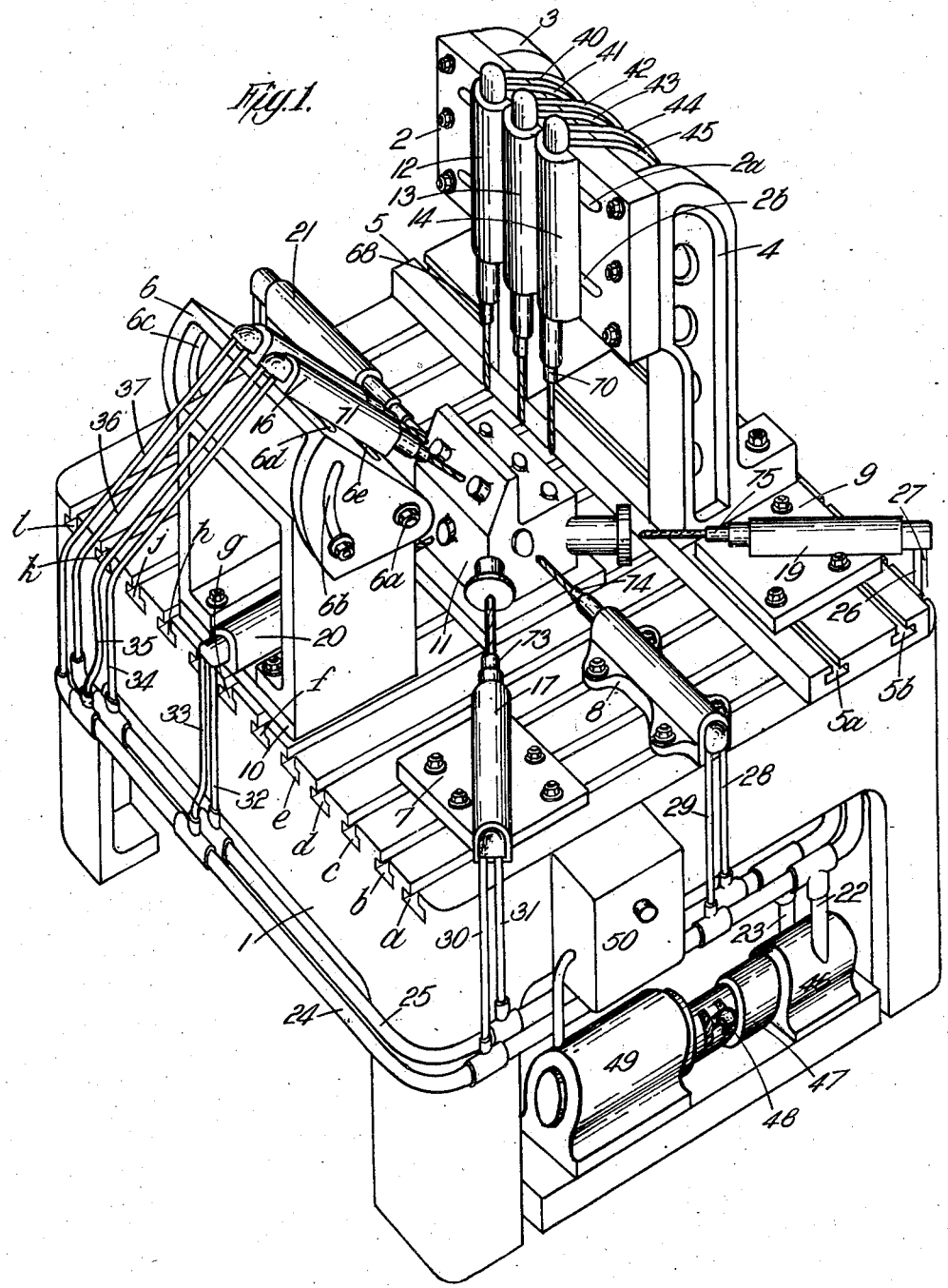
Figure 1 is a perspective view of the machine arranged for drilling or boring a workpiece.

Figure 1 shows a machine comprising a bedplate 1, provided with T slots $a$, $b$, $c$, $d$, $e$, $f$, $g$, $h$, $j$, $k$, $l$, upon which frame 2 having slots $2a$, $2b$ brackets 3, 4, bolster 5 having T slots $5a$, $5b$, angle plate 6 having hinge pin $6a$, and radial slots $6b$, $6c$, and slots $6d$, $6e$, spacing blocks 7, 8, 9, 10 and workpiece 11 are supported and secured in positions suitable to the plan of drilling or boring to be executed upon workpiece 11.

Upon the frame 2, brackets 3, 4, bolster 5, angle plate 6 and spacing blocks 7, 8, 9, 10 hydraulically operated detachable drilling or boring heads 12, 13, 14, 15, 16, 17, 18, 19, 20, 21, are mounted and secured at positions and angles suitable to the plan of drilling or boring to be executed upon workpiece 11.

The positions of drilling or boring heads 12, 13, 14, may be adjusted relatively to one another upon frame 2 within slots $2a$, $2b$ and the position of frame 2 together with brackets 3, 4, may be adjusted upon bolster 5, within T slots $5a$, $5b$, while the position of bolster 5, may be adjusted upon bedplate 1, within T slots $a$ to $l$, for the purpose of producing plans of drilling or boring differing from the plan of drilling of workpiece II. Similarly the position of drilling or boring heads 15, 16, may be adjusted upon angle plate 6 within slots $6d$, $6e$, and the angle of the said drilling or boring heads may be varied by altering the inclination of angle plate 6 about its hinge pin $6a$, and slots $6b$, $6c$, while the position of angle plate 6 may be adjusted upon bedplate 1 within T slots $f$, $g$, for the same purpose. The positions of drilling or boring heads 17, 18, 19, 21, and spacing blocks 7, 8, 9, may also be adjusted upon bedplate 1 as desired.

Power is supplied to each drilling or boring head 12, 13, 14, 15, 16, 17, 18, 19, 20, 21, by hydraulic pressure conveyed to liquid contained within the body of each of the said drilling or boring heads, and the connecting pipes 22, 23, 24, 25, 26, 27, 28, 29, 30, 31, 32, 33, 34, 35, 36, 37, 38, 39, 40, 41, 42, 43, 44, 45 connected thereto, by hydraulic pump 46 actuated through variable speed gear box 47 and associated change speed lever 48, by electric motor 49 under the control of push button operated control and cut-out switch 50 to which electric power is supplied from an outside source.

It is to be understood that the form, size, number and arrangement of the frames, brackets, bolsters, angle plates, spacing blocks and the drilling or boring heads before referred to is not confined to those illustrated but that other forms, sizes, numbers, and arrangements adaptable and otherwise may be utilized according to the formation of any particular workpiece to be dealt with and to the drilling or boring plan to be followed and executed.

Pipes 22 to 45 may be flexible or otherwise as found suitable.

Figure 2:
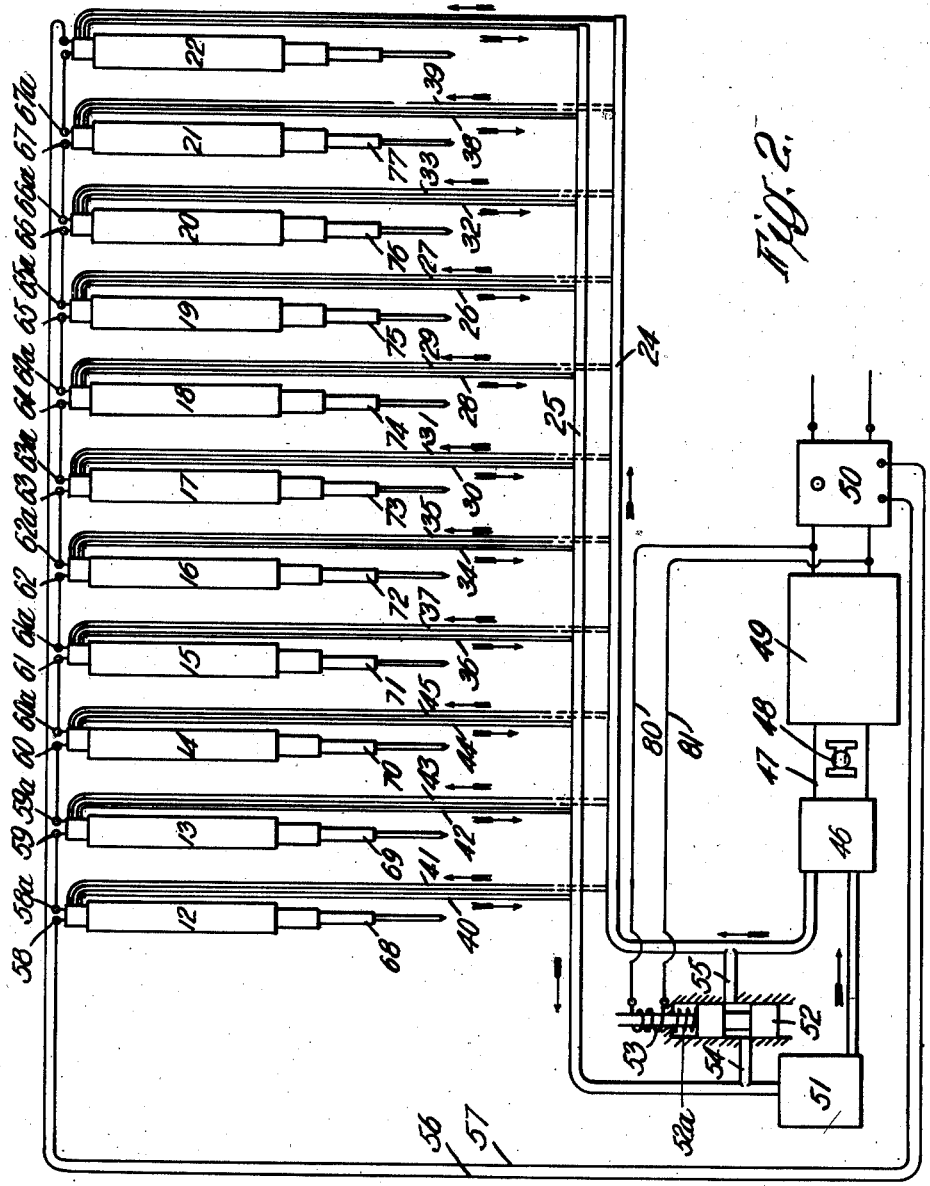
Figure 2 is a diagram of the hydraulic circuits of the machine, and also of the electrical connections of the machine.

The hydraulic circuits and the electrical connections of the machine are more completely illustrated in Figure 2. Herein 52, is a valve, 53 a solenoid coupled to valve 52, so arranged that when the said valve is under the control of spring 52a, port 55 is open to port 54, and when solenoid 53 is energised to overcome the resistance of spring 52a port 55 is closed to port 54.

Solenoid 53 is connected by a shunt connection 80, 81, to the main electrical circuit between control switch 50 and electric motor 49, so that immediately control switch 50 completes an electrical circuit through electric motor 49 valve 52 closes port 55 against port 54. This arrangement ensures that all hydraulic liquid used in actuating the pistons of the control valves of each drilling or boring head is provided with a free passage to reservoir immediately electric current is cut off from the machine.

Variable speed gear box 47 is disposed between hydraulic pump 46 and electric motor 49 to provide variation in the quantity of hydraulic liquid to be supplied to each of the drilling or boring heads 12, 13, 14, 15, 16, 17, 18, 19, 20, 21, for the purpose of altering when required the speed of rotation of drill or boring tool operating spindles 68, 69, 70, 71, 72, 73, 74, 75, 76, 77, housed within the said drilling or boring heads. The number of speed changes in gear box 47 may be that which will be most convenient for the purpose. The machine illustrated in the drawings, adopts a four speed variation under the control of change speed lever 48.

Figure 8:
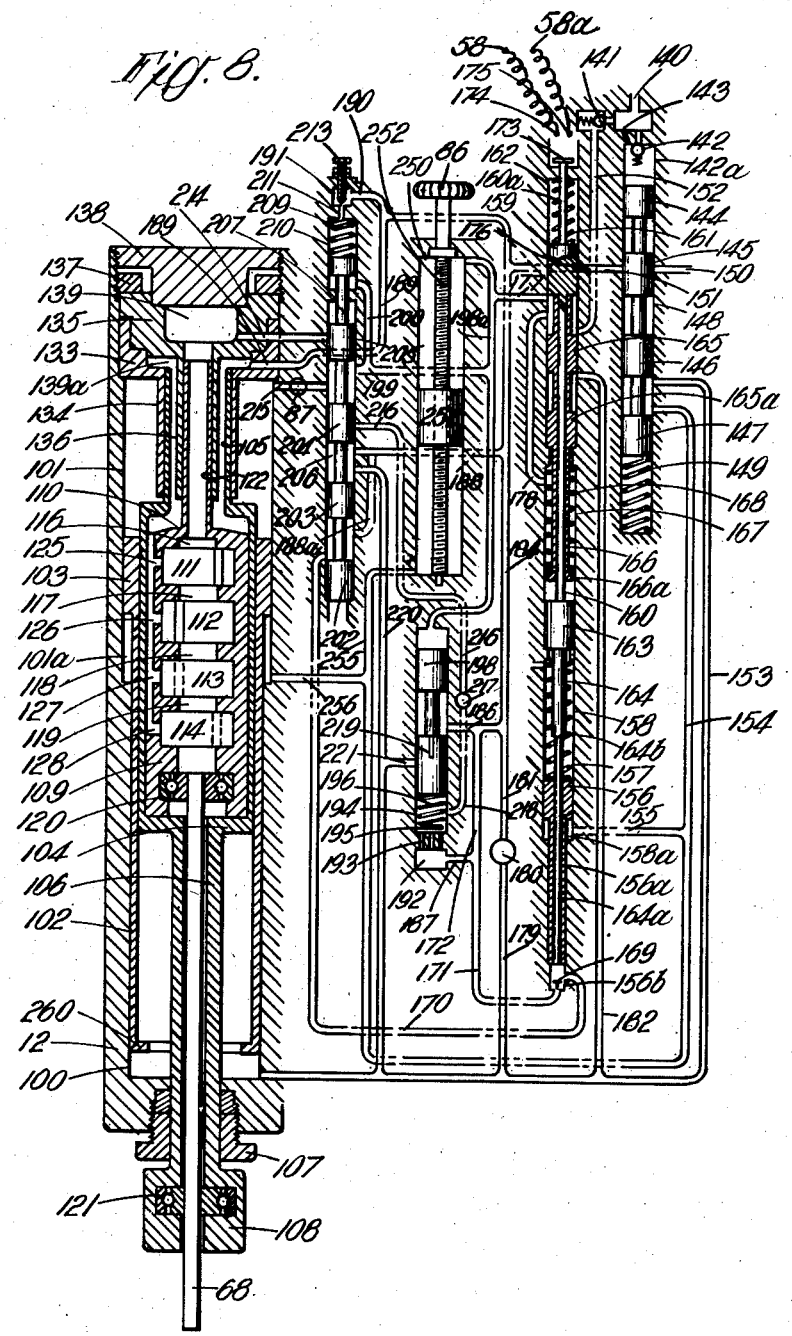
Figure 8 is a diagrammatic view in section of a drilling or boring head showing its mechanism and communicating ducts.

Push button operated control switch 50 has an electrical cut-out device and each of the drilling or boring heads 12, 13, 14, 15, 16, 17, 18, 19, 20, 21, is provided with an electrical contact maker 173 Figure 8 which automatically makes contact with contact points 174, 175, Figure 8 situated in each of the said drilling or boring heads, at the completion of each drilling or boring operation. The contact points 174, 175, in each drilling or boring head are respectively connected to terminals 58, 58a, 59, 59a, 60, 60a, 61, 61a, 62, 62a, 63, 63a, 64, 64a, 65, 65a, 66, 66a, 67, 67a, and these in turn are connected, by insulated wires, 56, 57, in series with the electrical cut-out device of control switch 50 so that as each drilling or boring head completes its drilling or boring operation and its contact maker makes contact, the circuit through the cut-out device of control switch 50 is gradually built up until the last drilling or boring head to complete its operation makes the last contact and completes the circuit through the said cut-out device and causes control switch 50 to break the main circuit of electric motor 49 and stop the machine.

The detachable drilling or boring heads 12, 13, 14, 15, 16, 17, 18, 19, 20, 21, which are each of similar construction are illustrated in Figures 3, 4, 5, 6, 7, 8, wherein 12 is the drilling or boring head casing. 140 is the inlet port for the hydraulic liquid, 86 is the knurled knob of screw 252 which adjusts the length of travel of the drill or boring tool operating spindle, 87 is a pressure regulator situated in duct 215, 217 is a regulating screw for controlling the slow speed of advance of drill or boring tool operating spindle, 213 is a regulating screw for controlling the rapid advance of the drill or boring tool operating spindle, 108 is the drill or boring tool operating spindle bearing housing formed in the end of ram extension 106, 68 is the drill or boring tool operating spindle, 250 is the drill or boring tool operating spindle travel regulating displacement cylinder, 251 is the travel regulating piston, 252 is the travel regulating screw, 141 is a non-return valve in the liquid inlet duct 140. Various ducts connecting the actuating valves with the hydraulic cylinder are cut in the drilling or boring head casing 12 which are not shown in Figures 6 and 7 but these are shown in diagrammatic form in Figure 8 and will be referred to later.

Referring to Figure 8, the drilling or boring head casing 12 encloses all valves and communicating ducts shown in this diagrammatic representation of one of these detachable units.

The drilling or boring head casing 12 has formed within it a cylindrical chamber 100 which at its upper end 101 has an enlarged bore. Into cylindrical chamber 100, 101, fits tubular member 102 upon which is integrally formed at its upper end piston 103 fitting the enlarged bore of chamber 101. Tubular member 102 and its piston 103 are so disposed within cylindrical chamber 100, 101, that a degree of longitudinal travel within cylindrical chamber 100, 101, may be imparted thereto when desired.

Tubular member 102 in turn has fitted within its bore a hollow piston type ram 104 which carries at its upper end extension tube 105 and at its lower end a tubular extension 106 which passes through gland 107 in boring or drilling head casing 12 and terminates in a ball and thrust race housing 108, carrying ball race 121. Ram 104 is disposed within tubular member 102 and head casing 12 so that while it may have imparted to it a degree of longitudinal movement within said tubular member it is restrained from rotation.

A hydraulic motor is housed within ram 104 comprising body portion 109, flange 110 integrally formed with tube 122 and secured to body portion 109, cylindrical rotors 111, 112, 113, 114, journal bearings 116, 117, 118, 119, drill or boring tool operating spindle 68 and ball or roller bearing 120 carrying the inner end of drill or boring tool operating spindle 68. Rotors 111, 112, 113, 114 are axially aligned and suitably coupled together and to drill or boring tool operating spindle 68.

Cylindrical chamber 101 in drilling or boring head casing 12 is fitted at its upper end, in a joint tight manner, with bush 133 formed integrally with tubular extension 134 constructed as a sliding fit upon tubular extension 105 of ram 104. A second bush 135 formed with an integral tubular extension 136 is fitted in a joint tight manner, within bush 133, the said tubular extension being constructed as a sliding fit upon tubular extension 122 of hydraulic motor body portion 109. Lock nut 137 secures bushes 135, 133 in position. A screwed sealing plug 138 fitted into the top of drilling or boring head casing 12 encloses the recessed chamber 139 formed within bush 135 in a joint tight manner.

Bush 135 is fitted into bush 133 in such a manner as to provide an annular chamber 139a between the said bushes. An annular chamber is also provided between tubular extension 136 on bush 135 and tubular extension 105 on ram 104. The annular chambers communicate by way of ducts 189, 176, 151, 150 with reservoir 51 through the pipes connecting the drilling or boring head casing 12 with hydraulic pressure generating system.

Chamber 139 communicates by way of ducts 214, 199, 198a, 177, 152, and connecting pipes with the pressure side of hydraulic pump 46.

Drilling or boring head casing 12 comprises inlet port 140, spring loaded non-return valve 141, spring loaded non-return valve 142 and restricted orifice 143 associated therewith piston 144 integrally constructed with piston valves, 145, 146, 147 lying within valve chamber 148, spring 149, outlet port 150, ducts 151, 152, 153, 154, 155, piston 156 working within chamber 158, piston 156a integrally formed with piston 156 but of smaller diameter, chamber 156b, spring 157, piston 159 working within chamber 162, piston rod 160, piston rod 160a, spring 161, piston 163, piston rod 164, plunger 164a integrally formed with piston rod 164, a shoulder 164b formed between piston rod 164 and plunger 164a, piston valve 165, 165a, with extension 166 slidably mounted and fitted upon piston rod 160, collar 166a, secured upon the lower end of extension 166, spring 168 interposed between collar 166a and necked portion of chamber 167, non-return valve 169, ducts 170, 171, 172, electrical contact maker 173 secured upon piston rod 160a, electrical contact points 174, 175, secured in an insulated manner within drilling or boring head casing 12, ducts 176, 177, 178, 179, relief valve 180, ducts 181, 182, 184, 186, 187, 188, 188a, 189, 190, chamber 192, ports 193 connecting chamber 192 with chamber 194, non-return valve 195, spring 196, piston valve 197, constructed integrally with piston 198, ducts 198a, 199, 200, chamber 206, piston valves 202, 203, 204, 205, constructed integrally with one another and connected by piston rod 207 to piston 208 lying within chamber 210, spring 209, orifice 211 leading from chamber 210 to chamber 191, adjustable needle valve 213, ducts 214, 215, 216, adjustable orifice 217, leading from ducts 216 to duct 218, ducts 220, 221, chamber 250, piston 251, screw 252, adjusting knob or handle 86, ducts 255, 256.

The machine is operated as follows:

A workpiece 11 having been mounted on bed-plate 1 and suitably secured, and drilling or boring heads 12, 13, 14, 15, 16, 17, 18, 19, 20, 21, having been set and secured respectively upon frame 2, brackets 3, 4, bolster 5, angle plate 6, and spacing blocks 7, 8, 9, 10, to produce the required plan of drilling or boring upon workpiece 11, hydraulic connection is established between the said drilling or boring heads and the hydraulic pump 46 by way of pipes 22 to 45.

The hydraulic pump being already connected to its source of power, the machine is ready for action as soon as each drilling or boring head has been adjusted with regard to the travel of its drill or boring tool operating spindle and its rate of advance.

Adjustment of each drilling or boring head is made in three ways. The first adjustment regulates the length of travel of the drill or boring tool operating spindle 68. This adjustment is made by turning knob 86 in a clockwise or anti-clockwise direction and gives either a short or long travel to the said drill or boring tool operating spindle. The second adjustment is made by turning screw 213 in clockwise or anticlockwise direction. This adjustment determines the period during which rapid advance without rotation may be given to drill or boring tool operating spindle 68. The third adjustment is made by turning screw 217 in clockwise or anticlockwise direction. This adjustment determines the period during which slow advance of the drill or boring tool operating spindle 68 takes place.

These adjustments having been made the machine will be ready for operation. Finger pressure on push button of switch 50 will cause all drill or boring tool operating spindles to commence advancing at the same instant of time. The moment each drill or boring tool operating spindle completes its drilling or boring operation in workpiece 11 the said drill or boring tool operating spindle will cease to advance, stop rotation, and commence to retract independently of the action of other drill or boring tool operating spindles.

As soon as the last drill or boring tool operating spindle to complete its drilling or boring operation has fully retracted, the whole machine will stop until again caused to actuate by pressure upon the push button of control switch 50.

The mechanism of each drilling or boring head and its actuation may be described as follows:

The length of travel of each drill or boring tool operating spindle 68 and its associated ram 104 and hydraulic motor 109, 111, 112, 113, 114 is regulated by the position given to tubular member 102 within the cylindrical chamber 100, 101 of each drilling or boring head. The position of tubular member 102 within cylindrical chamber 100, 101 is controlled by the displacement of hydraulic liquid contained within travel regulating displacement cylinder 250 under the movement of travel regulating piston 251 within chamber 250 by the hand rotation of travel regulating screw 252 at knob 86. Liquid contained in displacement cylinder 250 below piston 251 communicates, when the machine is not in operation, by way of ducts 255, 256, with the annular chamber 101a, formed between piston 103 of tubular member 102 and the step formed by the change of bore of cylindrical chamber 100, 101, and by way of ducts 154, 153 and piston valve 146, 147, with cylindrical chamber 100. Liquid contained within displacement cylinder 250 above piston 251 communicates, when the machine is not in action with cylindrical chamber 101 by way of ducts 198a 199, piston valves 204, 205, and duct 215. Movement of travel regulating piston 251 within displacement cylinder 250 in an upward direction by rotation of travel regulating screw 252 will withdraw liquid from cylindrical chamber 100 and annular chamber 101a and transfer a corresponding volume of liquid to cylindrical chamber 101 with the result that tubular member 102 will be displaced within cylindrical chamber 100, 101, in a downward direction. Movement of travel regulating piston 251 in a downward direction by rotation of travel regulating screw 252 will correspondingly displace liquid from cylindrical chamber 101 into cylindrical chamber 100, and annular chamber 101a and raise tubular member 102 within cylindrical chamber 100, 101. It will be obvious that displacement of tubular member 102 within cylindrical chamber 100, 101 may only be made when the machine is not in action.

Travel of ram 104 within cylindrical chamber 100, 101, is limited by the position of tubular member 102 within cylindrical chamber 100, 101. Contact of ram 104 with inturned flange 260 formed upon tubular member 102 when ram 104 is moving in an outward direction from cylindrical chamber 100, 101 under hydraulic pressure sets up hydraulic pressure in the liquid contained in annular chamber 101a with the result that piston 156 in chamber 158 which is in communication with annular chamber 101a by ducts 154, 155, 256, is caused to act upon piston valves 165, 165a, 159 and alter the flow of hydraulic liquid, so that ram 104 stops and retracts. This action is described later.

Actuation of the drill or boring tool operating spindle 68 of each drilling or boring head is secured by the passage of hydraulic liquid into inlet port 140 where it applies pressure to piston 144 through non-return valve 142 and causes the movement of piston valves 145, 146, 147, against spring 149, to open duct 150 to duct 151, and close duct 153 against duct 154. Piston valves 145, 146, 147 are maintained in the said position during the whole time hydraulic pressure is exerted upon piston 144.

From inlet port 140 hydraulic liquid passes into duct 152 through non-return valve 141, and thence into duct 177 through piston valve 159, 165, which at this time provides communication between duct 152 and duct 177. From duct 177 hydraulic liquid flows by way of ducts 198a, 199, through piston valve 204, 205 which at this time provides communication to duct 215 and thence into cylindrical chamber 101.

Hydraulic liquid also passes from duct 199 by way of duct 200 into chamber 210 and exerts pressure upon piston 208 and causes it to move into chamber 210 against spring 209 thereby displacing its associated piston valve 202, 203, 204, 205, to an extent which eventually opens duct 214 fully to duct 199, closes duct 220 against duct 188 restricts duct 215 to the flow of liquid from duct 199, and closes duct 170 against duct 188a. The rate of movement of piston 208 is variable, and is regulated by controlling the flow of liquid which takes place from the upper part of chamber 210 under the influence of the hydraulic pressure behind piston 208 when piston 208 is moving into chamber 210. The liquid flowing from chamber 210 under the influence of piston 208 passes through orifice 211 the area of which may be varied by screwing in or withdrawing needle valve 213. Variable orifice 211 permits a larger or smaller amount of liquid to pass from chamber 210 into chamber 191 according to the position of needle valve 213 and so increases or decreases the speed of movement of piston 208 and its associated piston valves 202, 203, 204, 205.

Slow movement of piston 208 and its associated piston valves 202, 203, 204, 205, delays the opening of duct 214 to duct 199, increases the period during which duct 215 is fully open to duct 199 for the whole volume of hydraulic liquid from duct 199 to flow into cylindrical chamber 101, and increases the period during which duct 220 is open to duct 188 for the unrestricted flow of liquid from chamber 100 to reservoir 51 by way of ducts 188, 190, 176, 151, 150 and connecting pipe 40. This arrangement causes ram 104 and its associated drill or boring tool operating spindle 68, to move rapidly out of cylindrical chamber 100, 101, during the time it takes piston 208 to complete its travel, under hydraulic pressure, into chamber 210 and finally close duct 220 to duct 188.

Rapid movement of piston 208 and its associated piston valves 202, 203, 204, 205 reduces to a minimum the period during which rapid movement of ram 104 outward from cylindrical chamber 100, 101, takes place.

When the movement of piston 208 into chamber 210 under hydraulic pressure is complete piston valve 202, 203, 204, 205, will fully open duct 214 to duct 199, duct 215 will be restricted against the flow of liquid from duct 199, duct 220 will be closed to duct 188, and duct 170 will be closed to duct 188a, and duct 216 will be open to duct 188. The moment this position of the said piston valve has been attained and the flow of hydraulic liquid through duct 215 to chamber 101 has been restricted, and the flow of liquid from chamber 100 through duct 220 has been cut off, the rate of movement of ram 104 outward from cylindrical chamber 100, 101, will be reduced to an extent which is regulated by the amount of flow of liquid permitted to pass from chamber 100 by way of ducts 153, 220, 221, piston valve 197, ducts 186, 190, 176, 151, 150, and connecting pipe 40 to reservoir 51, and the rotors 111, 112, 113, 114, with their associated drill or boring tool operating spindle 68 will commence to revolve under the pressure of hydraulic liquid flowing freely through ducts 199, 214, acting upon the said rotors.

Piston valve 197 formed integrally with piston 198, working within chamber 194, controls communication between duct 221 and duct 186 leading from cylindrical chamber 100, and maintains these ducts fully closed to one another by the pressure of spring 196 acting, at one end of chamber 194, upon the said piston valve, until such time as hydraulic pressure acting at the opposite end of chamber 194 upon piston 198 causes movement of the said piston valve within chamber 194 against the said spring. Chamber 194 is provided with a non-return suction valve 195 at its lower end below piston valve 197, arranged to communicate by way of ports 193, chamber 192, ducts 187, 172, 186, 190, 176, 151, 150 and connecting pipe 40 with reservoir 51. Chamber 194 is also provided at its lower end below piston valve 197 with a duct 218 leading from said chamber through adjustable orifice 217 and connecting to duct 216, the outlet of which is controlled by piston valve 204 as before said.

The upper end of chamber 194 above piston 198 is provided with a duct 198a connecting to duct 199 which leads to valve chamber 206, and also connecting to duct 177.

Piston valve 197 has an amount of "lap" over duct 221 which maintains duct 221 fully closed for a short portion of the said piston valve's travel and provides a restricted flow of hydraulic liquid from duct 221 to duct 186 for the remainder of its travel. The restricted flow of hydraulic liquid from duct 221 to duct 186 is secured by providing a groove 219 cut longitudinally in the face of piston valve 197 and extending for the last eighty per cent. of the lap of the said valve.

When hydraulic pressure is applied to piston 208, the same pressure is applied at the same time to piston 198 and tends to force the said piston with its associated piston valve 197 downwards into chamber 194 against the pressure of spring 196 but until piston 208 has moved upwards within chamber 206, under hydraulic pressure, sufficiently to cause piston valve 204 to open duct 216 to duct 188, piston 198 is unable to move within chamber 194 as there is no outlet for the liquid, with which chamber 194 is charged, except by way of duct 216. Immediately duct 216 is opened to duct 188 by piston valve 204 liquid is allowed to pass from chamber 194 at a rate determined by the setting of the adjustable orifice 217, and piston valve 197 commences to move downwards within chamber 194 under hydraulic pressure acting upon its associated piston 198.

Chamber 194, below piston valve 197, is kept fully charged with liquid by the suction of piston valve 197 on its return to the fully closed position under the action of spring 196, the said liquid being drawn through non-return valve 195, ports 193, chamber 192, ducts 187, 172, 186, 190, 176, 151, 150, and connecting pipe 40, from reservoir 51.

Immediately after piston valve 197 commences to move downwards within chamber 194, the closed position of duct 221 will have ceased, and a restricted flow of liquid will have commenced from duct 221 to duct 186 by way of groove 219 cut in face of piston valve 197. The restricted flow of liquid will continue until piston valve 197 has fully uncovered duct 221, when full flow of liquid from duct 221 to duct 186 will take place and the liquid in chamber 100 will freely pass to reservoir 51 by way of ducts 153, 220, 221, 186, 190, 176, 151, 150 and connecting pipe 40. During the time when restricted flow of liquid through valve 197 is taking place ram 104 and its associated drill or boring tool operating spindle 68 will move slowly outward from cylindrical chamber 100, 101. The period during which this slow movement of the drill or boring tool operating spindle takes place will depend upon the setting of adjustable orifice 217. This slow movement of the drill or boring tool operating spindle is introduced for the purpose of relieving the drill or boring tool of shock as it comes in contact with the workpiece.

Variable orifice 217 may be of needle valve type similar to 211, 213.

Immediately piston valve 197 has completely opened duct 221 to duct 186 full flow of liquid will be possible from cylindrical chamber 100, and ram 104 and its associated drill or boring tool operating spindle will be able to move outward from cylindrical chamber 100, 101, at such speed as may be required during a drilling or boring operation.

Piston 198 and its associated piston valve 197 maintains duct 221 in its fully open position to duct 186 until ram 104 contacts with flange 260 on tubular member 102.

Ram 104 contacts with flange 260 on tubular member 102 and as before stated causes hydraulic pressure in annular chamber 101a. Annular chamber 101a is connected by way of ducts 256, 154, 155, with annular chamber 158a formed between piston 156 and the step formed by change of bore between chambers 158, 156b.

Pressure formed in annular chamber 101a, by the moving ram 104 acting upon flange 260 of tubular member 102 raises differential piston 156, 156a, in differential chamber 158, 156b.

Differential piston 156, 156a which is of tubular form, has a large and a small diameter and is made to fit slidably in differential chamber 158, 156b, so that it may be moved within said differential chamber by hydraulic pressure created at intervals in the annular chamber 101a and transmitted by ducts 256, 154, 155, to annular chamber 158a against the reaction of spring 157 lying within chamber 158.

Differential piston 156, 156a, is adapted to have slidably fitted within its bore plunger 164a integrally formed with piston rod 164, the said plunger and piston rod being so disposed in relation to piston 156 that the said piston will contact, during its movement within chamber 158, after a period of free movement, with shoulder 164b on piston rod 164. When therefore piston 156 moves upward in chamber 158 under the influence of hydraulic pressure created by tubular member 102, the first part of its movement is utilized to store energy in spring 157. At the end of this period of free movement piston 156 contacts with shoulder 164b on piston rod 164 causing the said piston rod to be carried upward with piston 156 in its further movement. Piston rod 164 carries at its upper end piston 159 which, under the unopposed action of spring 162 closes duct 151 against duct 177 with considerable "lap" over both sides of the duct 151. The movement of piston 159 by piston 156 in its journey upwards reduces the "lap" of the said piston to zero on the pressure side. At the point where the "lap" of piston 159 over duct 151 is zero, balancing piston 163 formed upon the piston rod 164, 160, contacts in the continued movement of piston rod 160, 164, under the urge of piston 156 in its continued movement upward with extension 166 of piston valve 165, 165a, and carries said piston valve upward until its piston 165 has closed duct 152 against duct 177 and piston 159 has opened duct 151 to duct 177.

At this stage hydraulic pressure will have been cut off from cylindrical chamber 101 and the chamber will now be open to and in communication with reservoir 51 by way of ducts 215, 199, 198a, 177, 151, 150 and connecting pipe 40. In consequence the downward movement of ram 104 and tubular member 102 will cease and pressure in chamber 101a will fall to zero.

The stoppage of tubular member 102 arrests the upward movement of piston 156 and the fall of pressure in chamber 101a allows the stored energy in spring 157 to react upon piston 156 and causes it to descend within chamber 158, thereby displacing tubular member 102 and ram 104 in an upward direction within cylindrical chamber 100, 101, to an extent equal to the displacement of differential piston 156, 156a, within chamber 158.

During the upward movement of piston 156 within chamber 158, piston 156a, integrally formed with but of smaller diameter than piston 156, draws liquid into chamber 156b through non-return valve 169 from reservoir 51 by way of ducts 171, 186, 190, 176, 151, 150 and connecting pipe 40. This liquid will now be trapped in chamber 156b as the only outlet by way of duct 170 is closed by piston valve 202.

When piston 156 commences its downward movement after the closing of duct 152 by piston valve 165, the spring 157 will have stored considerable energy. The stored energy in spring 157 will now be dispersed in forcing piston 156 downward to the position from which it was first raised by the action of tubular member 102. In this downward movement of piston 156 and piston 156a liquid trapped in chamber 156b will force plunger 164a upwards in the bore of piston 156a, against the resistance of springs 168, 162, the combined strengths of which are much less than the strength of spring 157, and carry piston valves 165, 165a, 159 into a position in which duct 182 is opened to duct 152 and duct 177 is opened to duct 151. Hydraulic pressure will therefore enter cylindrical chamber 100 below ram 104 and cause said ram to move inwards to cylindrical chamber 100, 101 and discharge liquid contained in chamber 101 above said ram by way of ducts 215, 199, 198a, 177, 151, 150 to reservoir 51. Retraction of drill or boring tool operating spindle 68 associated with ram 104 will therefore take place.

Ram 104 will move inwards to cylindrical chamber 100, 101 until it seats against extension tube 134 when it will come to rest, and remain at rest until a new drilling or boring operation is commenced. Pressure will be maintained in cylindrical chamber 100 below ram 104 until the whole machine stops, liquid delivered to said chamber by the hydraulic pump being discharged back to reservoir 51 through relief valve 180 during this time.

Liquid trapped in chamber 156b will hold piston valves 165, 165a, 159, in the position at which retraction of drill or boring tool operating spindle 68 takes place until hydraulic pressure is cut off from all drilling or boring heads as it is only at that stage that piston valve 202 will open duct 170 to ducts 188a, 188, 190, 176, 151, 150 and reservoir 51.

As soon as piston valves 165, 165a, 159 are carried into the position at which retraction of the drill or boring tool operating spindle 68 takes place, contact maker 173 will contact with contact points 174, 175, and will remain in contact until all drilling or boring heads have completed their drilling or boring operations. As before stated contact points 174, 175, on each drilling or boring head are connected in series with one another and with electrical cut-out device on control switch 50, so that when all drilling or boring heads have completed a drilling or boring operation and all contact makers 173 are in contact with all contact points 174, 175, electrical cut-out device on control switch 50 will act and open control switch 50 thus cutting off power from electric motor 49 and stopping the hydraulic pump 46.

Contact maker 173 may alternatively be mounted conveniently upon ram 104 instead of piston valve 165, 165a, 159, and contact points 174, 175, may be suitably disposed within the drilling or boring head so that contact will be made between the said contact maker and the said contact points immediately after the ram 104 has returned to its fully retracted position.

Immediately hydraulic pressure is cut off from the machine, pressure on piston 144 of each drilling or boring head will be removed, and spring 149 will commence to move piston valve 145, 146, 147 into a position in which duct 150 is closed to duct 151 and duct 153 is opened to duct 154, but in order to allow all liquid contained in chambers 210 and 156b, to be fully discharged to reservoir 51 before piston valve 145, 146, 147, takes up the before said position, the liquid contained in chamber 142a is discharged slowly by way of small orifice 143 so that valves 145, 146, 147 move to said position slowly.

What I claim and desire to secure by Letters Patent of the United States is:

1. An electrically driven machine hydraulically and electrically controlled adapted to drill or bore a plurality of holes in a workpiece according to a set plan capable of variation, such machine comprising a plurality of drilling or boring heads, each of said heads comprising a cylinder to receive hydraulic pressure, a rotatable tool spindle, a piston type ram movable in said cylinder to advance said spindle, a second cylinder having ducts communicating with both ends of said first named cylinder, an adjustable control piston in said second cylinder to regulate the relative pressures in said first named cylinder and thereby the depth of penetration of the tool, and automatic means to retract the spindle on such depth being reached.

2. An electrically driven machine hydraulically and electrically controlled adapted to drill or bore a plurality of holes in a workpiece according to a set plan capable of variation, such machine comprising a plurality of drilling or boring heads, each of said heads comprising a cylinder to receive hydraulic pressure, a rotatable tool spindle, a piston type ram movable in said cylinder to advance said spindle, a second cylinder having ducts communicating with both ends of said first named cylinder, an adjustable control piston in said second cylinder to regulate the relative pressures in said first named cylinder and thereby the depth of penetration of the tool, a tubular member in said first named cylinder and comprising a stop to engage a shouldered portion of said piston type ram whereby said tubular member is caused to partake of the advancing movement of said ram, liquid pressure spaces between said tubular member and the inner wall of said first named cylinder, a third cylinder containing a piston to control the retraction of said ram, a spring opposing operative movement of said last named piston, said third cylinder being in communication with said liquid pressure spaces so that upon a movement of said tubular member to a predetermined extent the pressure in said third cylinder overcomes the resistance of the spring and causes the piston therein to perform its operative stroke.

3. In a machine comprising a plurality of adjustable drilling or boring heads, each carrying a hydraulically actuated piston type ram and a drill or boring tool operating spindle, for drilling or boring a multiplicity of holes simultaneously, means for regulating the length of travel and rate of advance of each piston type ram and its associated drill or boring tool operating spindle within each boring head, means for starting from one localised point the rotation and advance of each drill or boring tool operating spindle at one and the same instant, and for stopping the rotation of and retracting each ram and drill or boring tool operating spindle automatically and independently as it completes its drilling or boring operation, means for automatically stopping the operation of the whole machine immediately after the drill or boring tool operating spindle which last completes its drilling or boring operation has ceased to revolve and has been retracted from the workpiece, means for restoring the ram retraction mechanism to machine starting position, means to locate the said drilling or boring heads in such positions and at such angles relatively to the workpiece as will enable drills or boring tools housed within the said heads to drill or bore holes to a predetermined plan, wherein the positions of the said heads and their supports are adapted to be rearranged to produce various plans of drilling or boring upon different workpieces.

4. A machine as claimed in claim 3 wherein each of the plurality of drilling or boring heads includes a liquid charged cylindrical chamber, and a tubular member slidably fitting within said cylindrical chamber, wherein the piston type ram has an extended portion slidably disposed and fitting within the said tubular member, a plurality of cylindrical rotors and rotor chambers being housed within the said ram, the drill or boring tool operating spindle being rotatively mounted and secured within the said ram and coupled to said rotors, said machine also including a series of valves, liquid charged ducts and chambers adapted to receive and convey liquid under pressure to and from the said cylindrical chamber and the said rotor chambers, for the purpose of producing rotary motion in the said drill or boring tool operating spindle by the action of said liquid upon the said rotors during its passage through the said rotor chambers, and for the purpose of at the same time advancing the said ram outward from the cylindrical chamber and subsequently for retracting the ram inwards to the said cylindrical chamber.

5. A machine as claimed in claim 3, wherein each of the plurality of drilling or boring heads includes a dual piston valve serving to close, under the pressure of a spring, the liquid outlet port of the drilling or boring head involved and at the same time to make connection between a duct leading to the travel regulating displacement cylinder, a duct leading to the cylindrical chamber below the ram, and a duct leading to the annular chamber enclosed by the underside of the piston of the tubular member and the step formed in the cylindrical chamber by the change in the diameter of the bore, said machine also including a piston connnected to said dual piston valve so that the latter valve by hydraulic pressure exerted upon said piston in opposition to the said spring, opens the said liquid outlet port and at the same time breaks connection between the duct leading to the cylindrical chamber below the ram, and the duct leading to the annular chamber enclosed by the piston of the tubular member and the step in the said cylindrical chamber formed by the change of bore.

6. A machine as claimed in claim 3, wherein each of the plurality of drilling or boring heads includes a dual piston valve serving to close, under the pressure of a spring, the liquid outlet port of the said drilling or boring head and at the same time to make connection between a duct leading to the travel regulating displacement cylinder, a duct leading to the cylindrical chamber below the ram, and a duct leading to the annular chamber enclosed by the underside of the piston of the tubular member and the step formed in the cylindrical chamber by the change in the diameter of the bore, and which under hydraulic pressure exerted upon a piston, connected to the said dual piston valve, in opposition to the said spring, opens the said liquid outlet port and at the same time breaks connection between the duct leading to the cylindrical chamber below the ram, and the duct leading to the annular chamber enclosed by the piston of the tubular member and the step in the said cylindrical chamber formed by the change of bore, wherein the said piston connected to the dual piston valve reciprocates in a chamber adapted to receive liquid under pressure through a non-return valve which traps all liquid entering the said chamber and maintains it therein so long as pressure upon the liquid continues.

7. A machine as claimed in claim 3, wherein each of the plurality of drilling or boring heads includes a dual piston valve serving to close, under the pressure of a spring, the liquid outlet port of the said drilling or boring head and at the same time to make connection between a duct leading to the travel regulating displacement cylinder, a duct leading to the cylindrical chamber below the ram, and a duct leading to the annular chamber enclosed by the underside of the piston of the tubular member and the step formed in the cylindrical chamber by the change in the diameter of the bore, and which under hydraulic pressure exerted upon a piston, connected to the said dual piston valve, in opposition to the said spring, opens the said liquid outlet port and at the same time breaks connection between the duct leading to the cylindrical chamber below the ram, and the duct leading to the annular chamber enclosed by the piston of the tubular member and the step in the said cylindrical chamber formed by the change of bore, wherein the said piston is caused to discharge liquid slowly from the said chamber under the action of the spring bearing upon said dual piston valve, by way of a small orifice connecting said chamber with a liquid pressure supply duct.

8. A machine as claimed in claim 3, wherein each of the plurality of drilling or boring heads includes a quadruple piston valve which under the pressure of a spring closes a duct conveying liquid under pressure to a rotor chamber, opens fully a duct conveying liquid under pressure to a cylindrical chamber above the ram, opens a duct conveying liquid from a cylindrical chamber below the ram to an outside reservoir, opens duct conveying liquid from the annular chamber surrounding the differential piston controlling retraction of the ram to an outside reservoir, closes the duct conveying liquid from the chamber of the piston valve which controls the slow advance of the ram, and which under hydraulic pressure, acting in opposition to the said spring bearing upon quadruple piston valve, exerted upon a piston connected to the said quadruple piston valve opens the duct conveying liquid to the rotor chambers, restricts the opening of the duct conveying liquid to the cylindrical chamber above the ram, closes duct conveying liquid from cylindrical chamber below the ram to an outside reservoir, closes the duct conveying liquid from the annular chamber surrounding the differential piston controlling retraction of the ram to said outside reservoir, and opens a duct conveying liquid from the chamber of the piston valve which controls the slow advance of the ram.

9. A machine as claimed in claim 3, wherein each of the plurality of drilling or boring heads includes a quadruple piston valve which under the pressure of a spring closes a duct conveying liquid under pressure to a rotor chamber, opens fully a duct conveying liquid under pressure to a cylindrical chamber above the ram, opens a duct conveying liquid from a cylindrical chamber below the ram to an outside reservoir, opens duct conveying liquid from the annular chamber surrounding the differential piston controlling retraction of the ram to an outside reservoir, closes the duct conveying liquid from the chamber of the piston valve which controls the slow advance of the ram, and which under hydraulic pressure, acting in opposition to the said spring bearing under quadruple piston valve, exerted upon a piston connected to the said quadruple piston valve opens the duct conveying liquid to the rotor chambers, restricts the opening of the duct conveying liquid to the cylindrical chamber above the ram, closes duct conveying liquid from cylindrical chamber below the ram to an outside reservoir, closes the duct conveying liquid from the annular chamber surrounding the differential piston controlling retraction of the ram to said outside reservoir, and opens a duct conveying liquid from the chamber of the piston valve which controls the slow advance of the ram, wherein the said piston connected to the quadruple piston valve, reciprocates in a chamber charged with liquid on both sides of said piston, under hydraulic pressure applied and withdrawn at intervals on one side only of said piston against the reaction of the spring bearing upon the quadruple piston valve, and in which the movement of the said piston under hydraulic pressure may be retarded to a greater or lesser degree by regulating the rate of flow of liquid from the end of the chamber opposite to that in which hydraulic pressure is applied to the said piston.

10. A machine as claimed in claim 3, wherein each of the plurality of drilling or boring heads includes a quadruple piston valve which under the pressure of a spring closes a duct conveying liquid under pressure to a rotor chamber, opens fully a duct conveying liquid under pressure to a cylindrical chamber above the ram, opens a duct conveying liquid from a cylindrical chamber below the ram to an outside reservoir, opens a duct conveying liquid from the annular chamber surrounding the differential piston controlling retraction of the ram to an outside reservoir, closes the duct conveying liquid from the chamber of the piston valve which controls the slow advance of the ram, and which under hydraulic pressure, acting in opposition to the said spring bearing upon quadruple piston valve, exerted upon a piston connected to the said quadruple piston valve opens the duct conveying liquid to the rotor chambers, restricts the opening of the duct conveying liquid to the cylindrical chamber above the ram, closes duct conveying liquid from cylindrical chamber below the ram to an outside reservoir, closes the duct conveying liquid from the annular chamber surrounding the differential piston controlling retraction of the ram to said outside reservoir, and opens a duct conveying liquid from the chamber of the piston valve which controls the slow advance of the ram, wherein the said piston connected to the quadruple piston valve, reciprocates in a chamber charged with liquid on both sides of said piston, under hydraulic pressure applied and withdrawn at intervals on one side only of said piston against the reaction of the spring bearing upon the quadruple piston valve, and in which the movement of the said piston under hydraulic pressure may be retarded to a greater or lesser degree by regulating the rate of flow of liquid from the end of the chamber opposite to that in which hydraulic pressure is applied to the said piston, and wherein regulation of the flow of liquid from the said chamber is effected by an orifice which may be enlarged or reduced by a screw operated needle valve, and in which regulation of the flow of liquid from the said chamber controls the speed of movement of the quadruple piston valve thus determining the period during which rapid advance of the ram and its associated drill or boring tool operating spindle outward from the drilling or boring head takes place.

11. A machine as claimed in claim 3, wherein each of the plurality of drilling or boring heads includes a single piston valve which under pressure of a spring closes the duct conveying liquid from the lower part of a cylindrical chamber below the ram to a duct leading to an outside reservoir, and which under hydraulic pressure acting in opposition to said spring, exerted upon a piston connected to the said single piston valve, opens a duct conveying liquid from the lower part of the cylindrical chamber below the ram to the duct leading to an outside reservoir.

12. A machine as claimed in claim 3, wherein each of the plurality of drilling or boring heads includes a single piston valve which under pressure of a spring closes the duct conveying liquid from the lower part of a cylindrical chamber below the ram to a duct leading to an outside reservoir, and which under hydraulic pressure acting in opposition to said spring, exerted upon a piston connected to the said single piston valve, opens a duct conveying liquid from the lower part of the cylindrical chamber below the ram to the duct leading to an outside reservoir, wherein the said piston valve reciprocates in a liquid charged chamber adapted to draw in liquid by way of a non-return valve from an outside reservoir by the suction of the said piston valve in its movement within said chamber under the action of the said spring, and to discharge said liquid to an outside reservoir by way of a duct which is opened at intervals by one of the pistons comprised in the quadruple piston valve, under pressure exerted upon said single piston valve by its associated piston.

13. A machine as claimed in claim 3, wherein each of the plurality of drilling or boring heads includes a single piston valve which under pressure of a spring closes the duct conveying liquid from the lower part of a cylindrical chamber below the ram to a duct leading to an outside reservoir, and which under hydraulic pressure acting in opposition to said spring, exerted upon a piston connected to the said single piston valve opens a duct conveying liquid from the lower part of the cylindrical chamber below the ram to the duct leading to an outside reservoir, wherein the said piston connected to the said single piston valve is alternately subjected to and relieved of hydraulic pressure by the intermittent action of the piston valve controlling retraction of the ram, which creates and destroys communication between the chamber housing the said piston, and the source of hydraulic pressure.

14. A machine as claimed in claim 3, wherein each of the plurality of drilling or boring heads includes a single piston valve which under pressure of a spring closes the duct conveying liquid from the lower part of a cylindrical chamber below the ram to a duct leading to an outside reservoir, and which under hydraulic pressure acting in opposition to said spring, exerted upon a piston connected to the said single piston valve, opens a duct conveying liquid from the lower part of the cylindrical chamber below the ram to the duct leading to an outside reservoir, wherein the said single piston valve has a degree of "lap" over the duct it closes and opens, and is provided with a longitudinal groove cut in face of valve extending from edge of said piston valve for eighty per cent. of the "lap," through which a small volume of liquid will pass, during travel of said piston valve, to cylindrical chamber above the ram causing slow advance of ram outward from said cylindrical chamber.

15. A machine as claimed in claim 3, wherein each of the plurality of drilling or boring heads includes a single piston valve which under pressure of a spring closes the duct conveying liquid from the lower part of a cylindrical chamber below the ram to a duct leading to an outside reservoir, and which under hydraulic pressure acting in opposition to said spring, exerted upon a piston connected to the said single piston valve, opens a duct conveying liquid from the lower part of the cylindrical chamber below the ram to the duct leading to an outside reservoir, wherein a duct which is opened at intervals for the discharge of liquid to reservoir by one of the pistons comprised in a quadruple piston valve, communicates with and discharges all liquid through an orifice which may be enlarged or reduced at will by a screw operated needle valve for the purpose of controlling the speed of movement of said single piston valve and thereby determining the period during which slow advance of the ram and its associated drill or boring tool operating spindle outward from the drilling or boring head will take place.

16. A machine as claimed in claim 3, wherein each of the plurality of drilling or boring heads includes a liquid charged cylindrical chamber, an upper portion to the said cylindrical chamber of enlarged bore, a tubular member slidably disposed and fitting within said cylindrical chamber, a piston integrally formed at the upper end of said tubular member slidably disposed and fitting within said upper portion of said cylindrical chamber, an inturned flange integrally formed upon the lower end of said tubular member, a liquid charged chamber of annular form enclosed between the piston of the said tubular member and the step formed by the change of bore of the said cylindrical chamber, a liquid charged travel regulating displacement cylinder, a duct connecting between the said annular chamber and the bottom of the said travel regulating displacement cylinder, a rotatable travel regulating screw mounted within said displacement cylinder, a knob or handle connected to said travel regulating screw, a travel regulating piston slidably fitted within said displacement cylinder and screwing upon said travel regulating screw in a joint tight manner a duct connecting between the bottom of the said cylindrical chamber below the ram, and the said annular chamber wherein communication between said cylindrical chamber and said annular chamber may be broken at intervals by a valve, a duct connecting said annular chamber with the annular chamber surrounding the differential piston controlling the retraction of the ram, and a duct connecting the top of the displacement cylinder with upper part of cylindrical chamber above ram.

17. A machine as claimed in claim 3, wherein each of the plurality of drilling or boring heads includes a liquid charged cylindrical chamber, an upper portion to the said cylindrical chamber of enlarged bore, a tubular member slidably disposed and fitting within said cylindrical chamber, a piston integrally formed at the upper end of said tubular member slidably disposed and fitting within said upper portion of said cylindrical chamber, an inturned flange integrally formed upon the lower end of said tubular member, a liquid charged chamber of annular form enclosed between the piston of the said tubular member and the step formed by the change of bore of the said cylindrical chamber, a liquid charged travel regulating displacement cylinder, a duct connecting between the said annular chamber and the bottom of the said travel regulating displacement cylinder, a rotatable travel regulating screw mounted within said displacement cylinder, a knob or handle connected to said travel regulating screw, a travel regulating piston slidably fitted within said displacement cylinder and screwing upon said travel regulating screw in a joint tight manner, a duct connecting between the bottom of the said cylindrical chamber below the ram, and the said annular chamber wherein communication between said cylindrical chamber and said annular chamber may be broken at intervals by a valve, a duct connecting said annular chamber with the annular chamber surrounding the differential piston controlling the retraction of the ram, and a duct connecting the top of the displacement cylinder with upper part of cylindrical chamber above ram, wherein the movement of the travel regulating piston within the travel regulating displacement cylinder by rotation of travel regulating screw clockwise forces liquid from lower part of said displacement cylinder into annular chamber enclosed between the piston of the tubular member and step formed by the change of bore of the cylindrical chamber and into the bottom of the lower part of said cylindrical chamber by way of ducts controlled by one piston of the dual piston valve connecting between the said annular chamber and the said lower part of cylindrical chamber, at the same time as a corresponding quantity of liquid is withdrawn by the movement of the said travel regulating piston from the upper part of the said cylindrical chamber, and causes the tubular member to move upwards within the said cylindrical chamber to an extent equal to the displacement of liquid in said displacement cylinder, and wherein the anti-clockwise movement of said travel regulating screw displaces liquid from the displacement cylinder into the upper part of said cylindrical chamber and withdraws a corresponding quantity from said annular chamber and the lower part of said cylindrical chamber to lower said tubular member within said cylindrical chamber.

18. A machine as claimed in claim 3 wherein each of the plurality of adjustable drilling or boring heads comprises a liquid charged cylindrical chamber, an upper portion to the said cylindrical chamber of enlarged bore, a tubular member slidably disposed and fitting within said cylindrical chamber, a piston integrally formed at the upper end of the said tubular member slidably disposed and fitting within the said upper portion of said cylindrical chamber, an inturned flange integrally formed upon the lower end of the tubular member, a liquid charged chamber of annular form enclosed between the piston of the said tubular member and the step formed by the change of bore of the said cylindrical chamber, a piston type ram with extended portion slidably disposed within said tubular member, a second liquid charged chamber, a duct connecting between the said annular chamber and the said second chamber, a second piston slidably fitting within the said second chamber adapted to actuate means for stopping the advance of the piston type ram and subsequently securing its retraction within the said cylindrical chamber, a spring acting upon the said second piston of sufficient strength to prevent movement of the said tubular member by liquid pressure exerted upon the upper face of the piston of the said tubular member, wherein the said piston type ram during its advance outwards from the cylindrical chamber is caused to contact with the inturned flange of the said tubular member and impart movement to the tubular member, and wherein liquid contained within the annular chamber enclosed by the piston of the tubular member and the step formed by the change of bore of the cylindrical chamber is displaced by the movement of the tubular member and passes by way of the said duct to the said second chamber thereby giving movement to the said piston actuating means for stopping and retracting the said piston type ram.

19. A machine comprising a plurality of adjustable drilling or boring heads, each carrying a hydraulically actuated piston type ram, and a drill or boring tool operating spindle, for drilling or boring a multiplicity of holes simultaneously, means for regulating the length of travel and rate of advance of each piston type ram and its associated drill or boring tool operating spindle within each boring head, means for starting from one localised point the rotation and advance of each drill or boring tool operating spindle at one and the same instant, and for stopping the rotation of and retracting each ram and drill or boring tool operating spindle automatically and independently as it completes its drilling or boring operation, means for automatically stopping the operation of the whole machine immediately after the drill or boring tool operating spindle which last completes its drilling or boring operation has ceased to revolve and has been retracted from the workpiece, means for restoring the ram retraction mechanism to machine starting position, means to locate the said drilling or boring heads in such positions and at such angles relatively to the workpiece as will enable drills or boring tools housed within the said heads to drill or bore holes to a predetermined plan, wherein the positions of the said heads and their supports are adapted to be rearranged to produce various plans of drilling or boring upon different workpieces, and wherein the means for stopping the advance of the piston type ram, and securing its subsequent retraction within the said cylindrical chamber, comprises a differential cylinder, a differential piston, a second liquid charged chamber, a piston rod, a plunger integrally formed upon the end of the said piston rod slidably fitting within the bore of the said differential piston, a shouldered portion to the said piston rod, a balancing piston formed integrally upon the piston rod, a second piston mounted upon and secured to the piston rod, a piston valve slidably mounted and fitting upon the piston rod between the balancing piston and the second piston, a tubular extension formed integrally upon the piston valve, a collar fitted upon and secured to the said tubular extension, a series of liquid charged chambers slidably housing the said balancing piston, the second piston, and the piston valve, connected by short necks of reduced bore, a first spiral spring mounted upon the tubular extension of the piston valve interposed between the collar of the said tubular extension and an adjacent chamber neck, a second spiral spring interposed between the second piston and the end of the piston chamber, a third spiral spring of greater strength than the combined strength of the first and second spiral springs, interposed between the said differential piston and an adjacent chamber neck, a non-return valve situated in the lower portion of the small bore chamber of the differential cylinder below the differential piston, the whole of the said members being adapted to act in co-ordinated sequence to secure the arrest of the outward movement of the said piston type ram within the said differential chamber, and subsequently to secure the retraction of the said ram within the said cylindrical chamber.

20. In a machine as claimed in claim 19 means for actuating the said piston rod and its associated pistons and piston valve, wherein the said second liquid charged chamber may be constituted in the annular space formed by the change of bore of a differential cylinder and the change of diameter of a differential piston and wherein upward movement conveyed to the said differential piston by the movement of liquid in the said second liquid charged chamber compresses the said third spiral spring and stores therein, and at a later stage imparts upward movement to the said piston rod and its associated pistons and piston valve by engaging with the shouldered portion of the piston rod, for the purpose of arresting the outward movement of the said ram and subsequently retracting it within the said cylindrical chamber.

21. In a machine as claimed in claim 19 means for actuating the said piston rod and its associated pistons and piston valve, comprising means for reducing the "lap" of the said second piston to a minimum over the duct the said second piston controls before the said piston valve commences to move, the said "lap" reducing means comprising a space between the said balancing piston and the end of the tubular extension of the piston valve.

22. In a machine as claimed in claim 19 means for actuating the said piston valve wherein the balancing piston contacts after an interval of time during the upward movement of the piston rod with the end of the tubular extension of the said piston valve and imparts upward movement to the said piston valve against the reaction of the first spiral spring to the extent necessary to cause the piston of the piston valve to close the duct supplying pressure liquid to the upper part of the said cylindrical chamber, thereby stopping the outward movement of the said piston type ram within the cylindrical chamber.

23. In a machine as claimed in claim 19 means for actuating the said piston rod and its associated pistons and piston valve wherein the continued upward movement of the said differential piston after the balancing piston contacts with the tubular extension of the said piston valve, carries the said piston rod and its associated pistons and piston valve upwards as one unit so that as the duct supplying pressure liquid to the upper part of the said cylindrical chamber is closed by the said piston valve the dust conveying liquid from the upper part of the cylindrical chamber to an outside reservoir is opened by the said second piston.

24. In a machine as claimed in claim 19 means for actuating the said piston rod and its associated pistons and piston valve to secure retraction of the piston type ram, the said means comprising a plunger formed upon the lower end of the said piston rod slidably fitting within the bore of the said differential piston, a non-return valve adapted to permit the in-flow of liquid into the small bore chamber of the said differential chamber and prevent the escape of the said liquid therefrom, wherein the upward movement of the said differential piston draws liquid into the said small bore chamber through the said non-return valve and the non-return valve entraps the liquid therein, and the cessation of liquid pressure in the annular chamber surrounding the said differential piston permits the downward travel of the said differential piston under the pressure of the third spiral spring to displace the liquid contained within the small bore chamber of the said differential chamber and raise the plunger of the said piston rod within the bore of the differential piston thereby causing the upward movement of the piston rod and its associated pistons and piston valve to a position in which the said piston and piston valve opens the duct conveying pressure liquid to the lower part of the said cylindrical chamber where the said liquid acts upon underside of the piston type ram and causes the said ram to retract within the cylindrical chamber.

25. In a machine as claimed in claim 19, means for actuating the said piston rod and its associated pistons and piston valve to secure the return of the said piston rod to starting position, the said means comprising a liquid charged duct connecting the small bore chamber of the differential chamber below the differential piston with a non-pressure reservoir, a piston valve controlling the flow of liquid through the said duct from the said small bore chamber to the said non-pressure reservoir, the said piston valve being a component of the said quadruple piston valve, adapted to open the said duct for the flow of liquid from the said small bore chamber to the non-pressure reservoir immediately the retraction of the piston type ram within the cylindrical chamber is completed.

26. In a machine as claimed in claim 19, means for automatically stopping the operation of the whole machine immediately after the drill or boring tool operating spindle which last completes its drilling or boring operation has ceased to revolve and has been retracted from the workpiece, the said means comprising an electrical contact maker mounted upon each said piston rod, a pair of electrical contact points housed within each said drilling or boring head, electrical cables connecting the electrical contact points of each drilling or boring head in series with one another and with an electrical cut-out device associated with the control switch of an electric motor driven liquid pressure pump supplying liquid pressure to the said drilling or boring heads, wherein the said electrical contact maker of each drilling or boring head is adapted to make contact with the said electrical contact points during the upward movement of the said piston rod for the purpose of completing an electrical circuit through the electrical cut-out device of the said control switch of the said electric motor driven pressure pump and stopping the action of the whole machine.

27. In a machine as claimed in claim 3, means for actuating and for subsequently restoring the ram retraction mechanism of each drilling or boring head to the machine starting position, the said means comprising within each said drilling or boring head, a liquid charged duct connecting the small bore of the said differential cylinder below the differential piston, with a non-pressure reservoir, a valve adapted to control the flow of liquid in the said duct, a piston associated with the said valve working within a cylinder, the said cylinder being liquid charged on one side of said piston, and open to atmosphere on the other side of said piston, a spring housed within the atmospheric end of the said cylinder between the end of the said cylinder and the said piston adapted to exert pressure upon the said piston, wherein the liquid charged end of the said cylinder is adapted to communicate with the source of liquid pressure actuating the said drilling or boring heads, and receive additional charges of liquid for the purpose of displacing the said piston within the said cylinder against the reaction of the said spring each time liquid pressure is created within the said cylinder by the starting of the machine, and wherein the said piston, under liquid pressure within said cylinder, actuates the said valve to stop the flow of liquid within the said duct and thereby retains liquid within the small bore of the said differential cylinder for the purpose of securing the actuation of the ram retraction mechanism, and wherein the said piston under the reaction of the said spring within the said cylinder, immediately after the source of liquid pressure has ceased to function, actuates the said valve to permit the flow of liquid within the said duct from the said differential cylinder to the said non-pressure reservoir for the purpose of restoring the ram retraction mechanism to the machine starting position.

28. An electrically driven machine which is hydraulically and electrically controlled and adapted to drill or bore a plurality of holes in a workpiece according to a set plan capable of variation, said machine comprising a plurality of drilling or boring heads, each of said heads comprising a cylinder adapted to receive hydraulic pressure, a rotatable tool spindle, a piston type ram movable in said cylinder to advance said spindle, a tubular member interposed between the cylinder and said piston type ram, said tubular member being movable within the said cylinder independently of the piston type ram by controlled changes in the relative volumes of liquid contained in the two ends of said cylinder, a second cylinder having ducts communicating with both ends of the first named cylinder, an adjustable control piston in said second cylinder serving to regulate the relative volumes of liquid in the two ends of the first named cylinder and thereby the position of the said tubular member within the said first cylinder, means causing the position of the tubular member within the first cylinder to regulate the depth of penetration of the drilling tool, and means causing said piston type ram to impart a predetermined movement to said tubular member and thereby effect automatic retraction of the tool operating spindle.

29. An electrically driven machine which is hydraulically and electrically controlled and adapted to drill or bore a plurality of holes in a workpiece according to a set plan capable of variation, said machine comprising a plurality of drilling or boring heads, each of said heads comprising a cylinder adapted to receive hydraulic pressure, a rotatable tool spindle, a piston type ram movable in said cylinder to advance said spindle, a second cylinder having ducts communicating with both ends of said first named cylinder, an adjustable control piston in said second cylinder serving to regulate the relative volumes of liquid in the two ends of the first named cylinder, a tubular member in said first named cylinder comprising a stop to engage a shouldered portion of said piston type ram in a position causing said tubular member to partake, to a limited extent, of the advancing movement of said ram, there being liquid pressure spaces between said tubular member and the inner wall of the first named cylinder, a third cylinder containing a piston adapted to actuate means for controlling the depth of penetration of the drilling tool and the retraction of the said ram and its associated tool operating spindle and drilling tool on completion of penetration by the drilling tool, a spring opposing operative movement of said last named piston, said third cylinder being in communication with said liquid pressure spaces so that movement to a predetermined extent of said tubular member by the moving ram causes liquid pressure in said third cylinder to overcome the resistance of said spring and initiate an operative stroke of the piston in said third cylinder.

GAVIN RALSTON.